United States Patent Office 3,258,092
Patented June 28, 1966

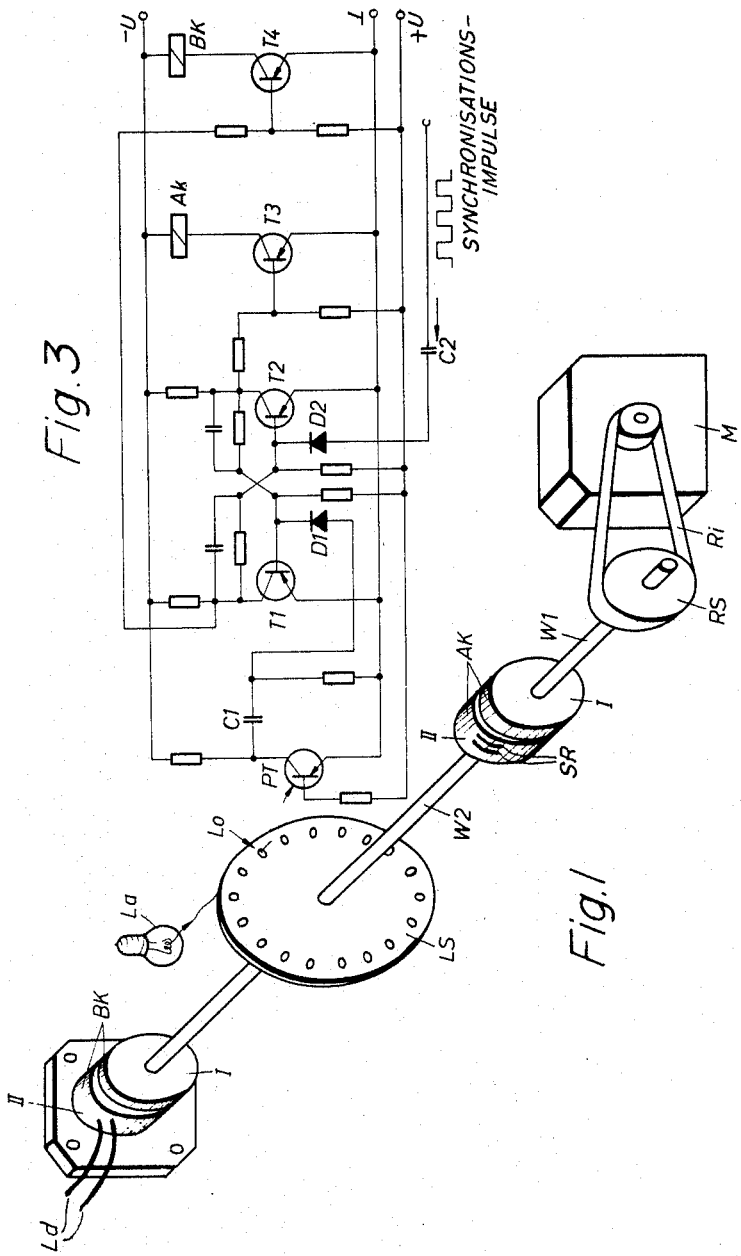

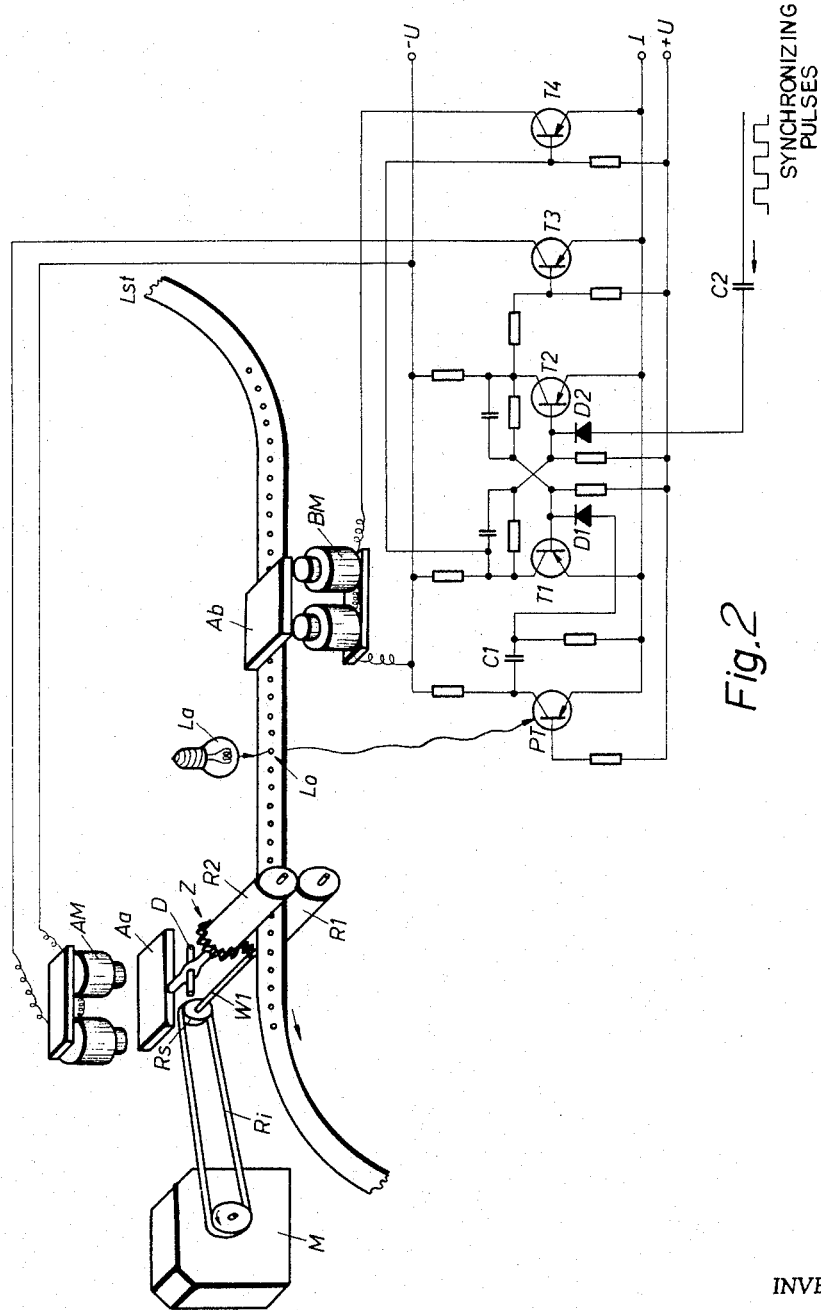

3,258,092
PULSE OPERATED CLUTCH AND BRAKE FOR CONTROLLING SPEED OF DRIVEN MEMBER
Werner Schiebeler, Eutingen, Baden, Germany, assignor to International Standard Electric Corporation, New York, N.Y., a corporation of Delaware
Filed Oct. 9, 1962, Ser. No. 229,463
Claims priority, application Germany, Oct. 13, 1961, St 18,432
5 Claims. (Cl. 192—18)

In fulfillment of many technical tasks it is necessary to have mechanically moved parts of devices or entire machines that are located apart from each other run in synchronism. This was of particular importance in facsimile telegraphy and in the early period of the teleprinter art. One of the solutions was to use synchronous motors as drive engines which were fed at their separate locations by synchronous generators, for example, crystal or tuning-fork controlled oscillators. Despite the relatively high expenditure this method did not achieve a complete synchronization because a sufficiently exact synchronizing run of two equipments could only be achieved over a certain period.

The following describes an arrangement according to the invention which may be used, for example, in high-speed teleprinter machines. Said arrangement may also be used for many other tasks. However, it is a prerequisite that synchronizing or timing pulses be fed to the arrangement to be synchronized. Those pulses may be derived in the teleprinter art from the sequence of the teletype pulses.

An advantage of this arrangement is that it needs no frequency-exact generator, no synchronous motor and no regulation of the driving motor.

The principle of the invention for synchronizing is described in connection with the accompanying drawings, in which: FIGURE 1 is a perspective view of an arrangement according to the invention; FIGURE 2 is a perspective view of another arrangement with a control circuit according to the invention; and FIGURE 3 is a schematic view of the control circuit used in connection with FIGURE 1.

The first example deals with the synchronization of a rotating shaft which is used to drive a part of a teletypewriter. This part can be, for example, the printing mechanism.

The principle of the arrangement according to the invention is schematically represented in FIG. 1. The motor M drives via a belt $Ri$ a pulley RS which is firmly connected with the shaft W1. On the other side one half I of the electromagnetic drive clutch AK is connected to the shaft W1. This clutch may be a clutch either with or without sliding rings. FIG. 1 shows schematically a clutch with sliding rings SR. The second half II of the drive clutch AK is firmly attached to the shaft W2. Furthermore, perforated disk LS is mounted on the shaft W2 and on the rear end one half I of the electromagnetic brake clutch BK is connected. The second half of this brake clutch with coil leads $Ld$ is firmly connected with the chassis of the equipment.

If the motor M is switched on and neither the drive clutch AK nor the brake clutch BK are electrically excited the shaft W2 will either turn not at all or only very slowly under the influence of a small mechanical friction in the clutch AK. If now the drive clutch AK is electrically excited, both clutch parts I and II will adhere firmly to each other due to the magnetic forces, so that the shaft W2 is driven by the shaft W1 without any backlash.

Next the driven clutch AK will be switched off and the brake clutch BK excited. In the brake the two clutch parts I and II adhere due to the magnetic forces in the same way as described above, and brake within a very short time the motion of the shaft W2 completely. The perforated disk LS is stopped, too. By control means it is possible to give shaft W2 the same r.p.m. as the shaft W1 possesses or to bring it to a complete standstill.

In reality this control, according to the invention, is achieved via an electronic control device represented in FIG. 3. In this control device the magnetic coils AK and BK of the drive clutch AK and the brake clutch BK are inserted between the supply $-U$ and the collector circuit of transistors T3 and T4. The transistors T3 and T4 respectively are controlled by the flipflop T1–T2, and the small unmarked rectangles serve as biasing and load resistors for the transistors. If T2 is blocked, then T3 is conductive. Through coil AK a current flows whereby the drive clutch AK is completely excited. If on the other hand T1 is blocked by a positive base-impulse, T4 becomes conductive and T3 blocked. Thereby AK is deenergized, but BK excited. The brake clutch BK is now fully effective braking the shaft W2.

In order to control the alternation between driving and braking, a perforated disk LS with a series of openings or holes Lo is used, the disk being positioned on shaft W2. If one of the holes Lo is just in front of the phototransistor PT the light from lamp La beams on the phototransistor and opens it. Thereby a positive voltage leap occurs at the collector of PT, which leap is led via C1 and D1 to the base of T1 as a positive impulse. T1 is blocked and T2 becomes conductive. At the same time T3 is blocked and T4 becomes conductive. In this way the drive mechanism is switched off and the brake is applied. If the base of T2 now receives a positive impulse via the capacitor C2 and the diode D2, which impulse is marked as synchronization or stepping-on impulse, the flipflop T1–T2 triggers into its second stable position. T2 blocks, T1 becomes conductive, T3 becomes conductive and T4 is cut off. Now the brake is switched off and the drive switched on via the coil AK. The shaft W2 now follows the shaft W1. The perforated disk LS is turned a certain distance until the light beam of lamp La having been blacked-out in the meantime falls upon the phototransistor PT through the succeeding hole Lo of the perforated disk. PT becomes conductive again and furnishes another positive brake impulse on the base of T1 from the PT-collector via C1 and D1. T1 is cut off, T4 becomes conductive, T2 is conductive and T3 is cut off. By this the entire drive mechanism is switched off and the brake is applied. Simultaneously, the rotation of shaft W2 is braked. This alternating operation is repeated, if further synchronization pulses are forwarded via capacitor C2 to the base of T2.

If the number $n$ of holes Lo on the perforated disk LS is sufficiently high the rotation of the perforated disk and consequently the rotation of shaft W2 takes place in very small steps. If now the frequency $f_1$ of the synchronization pulses is sufficiently high the stepping forward of the disk is so quick that practically a continual rotation of shaft W2 is given. This continuity of rotation is further supported by the magnetic inertia of the clutches and the mechanical inertia of the entire system or equipment. By this the r.p.m. of shaft W2 can be modified within a wide range by varying the synchronizing pulses, independent of the r.p.m. of the motor M. The following correlations shall be considered thereby:

(1) At a low frequency of the synchronizing pulses the shaft W2 rotates jerkily and in small steps.

(2) The r.p.m. of shaft W2 can never become higher than the r.p.m. of the drive shaft W1.

(3) If one imagines that the shafts W1 and W2 are rigidly connected, the number $n$ of the holes passing in this case per second, which equals the pulse-frequency $f2$ produced by the phototransistor, must be higher than the pulse-frequency $f1$. As soon as $f1$ becomes larger than $f2$ an r.p.m. of shaft W2 accidentally occurs which is no longer controllable.

It may be mentioned at random that for the drive clutch, and brake clutch not only electromagnetical but also electrostatical or other suitable clutches may be used, as long as they are controlled electrically and are not too inert.

Using the perforated disk LS is only an example. In the same way a disk with an annular magnetic track may be used which excites a pick-up head instead of the phototransistor. Also other arrangements with different dielectrical or mechanical switching arrangements may be used.

In some cases the brake clutch BK may be unnecessary for synchronization if a sufficiently large mechanical load of shaft W2 exists, maybe by mechanically connected parts of the equipment. In this case the r.p.m. is controlled and modified only by the ratio of switch-in and switch-off period of the drive clutch AK. The electronic device remains unchanged except that the transistor T4 can be discarded.

Practically a different backlash between the two clutch parts I and II occurs which is zero at a 100% switch-in period and corresponds at zero percent switch-in period the r.p.m. of shaft W1.

The arrangement according to the invention, however, is not limited to apply it to rotations but may also be used to synchronize linear movements. A possible arrangement is shown in FIG. 2. Here the perforated disk LS is replaced by a perforator L$st$. The perforator in this example is the part which shall be moved on mechanically and the advancing speed shall be controlled. Instead of the clutches two magnets are provided namely the drive magnet AM and the brake magnet BM. The drive magnet AM operates on an armature A$a$ which is connected with the drive roller R2. This arrangement pivots on the axle D. The drive motor M now drives via belt R$i$ the belt pulley RS and the shaft R1. The drive roller W1 is also positioned on shaft R1. Both drive rollers R1 and R2 are engaged via two tooth-wheels Z. Instead of the brake clutch BK shown in FIG. 1 a brake magnet BM as demonstrated in FIG. 2 is provided. This brake magnet operates armature A$b$. Between the armature A$b$ and the poles of the brake magnet the perforated tape L$st$ passes through. If the brake magnet is excited the armature A$b$ presses upon the perforated tape L$st$ tightly onto the poles of the brake magnet BM. By this the previously moved perforator tape comes to a standstill within a short time.

If the brake magnet BM is now switched-off and the drive magnet AM excited the latter lifts the armature A$a$ and thereby presses the roller R2 including the perforator tape L$st$ towards the roller R1. Thereby the perforator tape will be moved by both rollers and advanced corresponding to their circumferential speed or velocity. The advancing speed of the perforator tape can now be controlled in a similar way as shown in the arrangement of FIGS. 1 and 3 by suitable switching-over between the drive magnet AM and the brake magnet BM. Both magnets are electrically controlled via the transistors T1 to T4 and the phototransistor PT shown in the lower part on FIG. 2. The series of holes required to let pass the light beam from the lamp L$a$ to the phototransistor PT is now furnished by the holes L$o$ of the perforator tape L$st$.

If a positive synchronizing or advancing impulse is applied to the base T2 via capacitor C2 the flip-flop T1–T2 triggers in such a way that T2 is cut off. Thereby T3 becomes conductive and T4 is cut off. The brake magnet BM is switched-off and the drive magnet AM excited. The perforator tape is advanced by the rollers R1, R2. This motion remains until another light beam from the lamp L$a$ falls through the next following hole L$o$ of the perforator tape upon the phototransistor PT. PT becomes conductive and applies a positive impulse to the base of T1 from its collector via C1 and D1. T1 is cut off and T2 becomes conductive. Simultaneously T4 becomes conductive and T3 is cut off. This means that the drive is switched-off and the brake applied. The perforator tape is now kept in place by the poles of the brake magnet whereby the rollers R1 and R2 pass over the perforator tape without moving the latter. This alternate operation is repeated by further synchronizing pulses via C2 and D2. By changing the frequency of these synchronizing or advancing pulses the average advance velocity of the perforator tape L$st$ can be modified.

In contrast to the arrangement shown in FIGS. 1 and 3 it is generally considered for the arrangement shown in FIG. 2 that the advance of the perforator tape is achieved in steps and not continually even at a high frequency of the synchronizing pulses. Due to the small mechanical mass of the perforator tape such a step-by-step advance can be obtained relatively simply even at a high stepping speed, if the time constant of the drive and the brake magnet is suitably dimensioned.

The essential idea of the arrangements shown in FIGS. 1, 3 and 2 is that the advancing velocity of the mechanically operated parts is independent in a wide range from the r.p.m. of the motor M and also independent in a wide range from the load due to the driven machine components due to the controlled change between the drive and brake via the synchronizing pulses. If the perforated disk LS shown in FIG. 1 is heavily braked manually or if the perforated tape L$st$ in FIG. 2 is braked the same way, the advancing velocity and/or the stepping number per second remains constant with an increasing brake force as long as the friction force in the drive clutch AK or the braking force between the rollers R1 and R2 sufficiently exceeds. If, however, the braking force is further increased the advancing and/or stepping velocity suddenly leads from a certain value to half that value. This type of control never permits any intermediate steppings, because at a too large backlash in the driving element another stepping-on order occurs via the condenser C2, but no braking order was given via C1. Thus the advancing command is ineffective and only the next following advancing command (that is every second) switches on the drive again and switches off the brake. Therefore the advancing velocities are divided in half at too heavy a load.

Another possibility of the synchronous r.p.m. control by impulses arriving from the outside result in the conversion of the principle according to the invention.

According to FIGS. 1 and 3 another possible mode of operation is indicated in that the drive clutch AK and the brake clutch BK are alternately controlled by pulses.

As a first and easy modification it was indicated that controlling of the brake clutch can be dispensed with and replaced by a constant braking force which is normally given already by the friction of the mechanical parts but which may also be produced by a modest constant friction in the brake clutch BK. In the latter case the transistor T4 should be replaced by a resistor of suitable size.

The latter mode of operation may now be reversed by controlling the brake clutch BK through pulses and creating in the drive clutch AK a sufficiently large but constant friction force. The electronic for control purposes is nearly unchanged. Only the transistor T4 must be added again and the transistor T3 replaced by a resistor of suitable size. In this latter case the r.p.m. is controlled by a change of the load whereby the drive power remains constant while in the previous case the drive power transmitted through AK has been changed and the load remains constant. In the first of the cases described the load is modified by the brake clutch BK as well as the drive power by the drive clutch AK in order to control the r.p.m.

While I have described above the principles of my invention in connection with specific apparatus, it is to be clearly understood that this description is made only by way of example and not as a limitation to the scope of my invention as set forth in the accompanying claims.

What is claimed is:

1. Controllable apparatus comprising:
   continuous drive means;
   movable means having a series of openings, said movable means to be intermittently driven by said drive means;
   a drive coil and coupling arrangement interconnecting said drive means and said movable means to drive said movable means when said drive coil is energized;
   a brake coil and braking arrangement, said braking arrangement to intermittently engage said movable means to brake said movable means when said brake coil is energized;
   a source of synchronizing pulses;
   a light source disposed on one side of said movable means openings, and a photoelectric transistor disposed to receive light through said openings from said light source to produce a brake pulse; and
   a control circuit responsive to said synchronizing pulses for selectively energizing said drive coil to cause said coupling arrangement to interconnect said drive means and said movable means to drive said movable means, the said circuit being responsive to said brake pulses to selectively energize said brake coil and de-energize said drive coil causing said braking arrangement to brake said movable means, whereby, the speed of movement of said movable means is determined by the ratio of synchronizing to brake pulses.

2. Controllable apparatus according to claim 1, wherein said control circuit to control the movement of said movable means comprises:
   a flipflop transistor arrangement;
   two amplifying transistors;
   means connecting said flipflop arrangement and said amplifying transistors so that a pulse applied to one transistor of said flipflop will block said one flipflop transistor and cause one of said amplifying transistors to become conductive, and a pulse applied to the other transistor of said flipflop to block said other flipflop transistor and cause said other amplifying transistor to become conductive;
   said drive coil being connected to one of said amplifying transistors, and said drive coil being energized when said one amplifying transistor is conductive;
   said brake coil being connected to the other of said amplifying transistors, and said brake coil being energized when said other amplifying transistor is conductive;
   means for applying said synchronizing pulse to one transistor of said flipflop, blocking said one flipflop transistor and causing said one amplifying transistor connected to said drive coil to become conductive, energizing said drive coil and causing said drive coupling arrangement to interconnect said drive means and said movable means; and
   means for applying said brake pulse from said photoelectric transistor to the other transistor of said flipflop, blocking said other flipflop transistor and causing said other amplifying transistor connected to said brake coil to become conductive, energizing said brake coil and causing said braking arrangement to brake movable means.

3. Controllable apparatus according to claim 2, wherein said movable means comprises:
   an output shaft and a perforated disc;
   said output shaft being attached at one end to said drive coupling arrangement and at the other end to said braking arrangement;
   said perforated disc being rigidly mounted to said shaft to be driven with said shaft when said shaft is connected by said drive coupling arrangement to said drive means, and to be braked with said shaft by said braking arrangement;
   said light source being adjacent one face of said perforated disc, and said photoelectric transistor being adjacent the other face of said perforated disc and being positioned to receive the light passing through the perforations on said disc; and
   said photoelectric transistor, in response to the received light, producing said brake pulses according to the arrangement of the perforations on said disc.

4. Controllable apparatus according to claim 2, wherein said movable means comprises a perforated tape, said tape being engaged at one point by said drive coupling arrangement to be driven by said drive means and being engaged at another point by said braking arrangement to be braked by said braking arrangement;
   said light source being adjacent one face of said perforated tape, and said photoelectric transistor being adjacent said other face of said tape and being positioned to receive the light passing through the perforations on said tape;
   said photoelectric transistor being responsive to the received light to produce said brake pulses according to the arrangement of the perforations on said tape.

5. Controllable apparatus comprising:
   continuous drive means;
   movable means having a series of openings, said movable means to be intermittently driven by said drive means;
   a drive coil and coupling arrangement interconnecting said drive means and said movable means to drive said movable means when said drive coil is energized;
   a source of synchronizing pulses in a predetermined sequence;
   a light source disposed on one side of said openings, and a photoelectric transistor disposed to receive light through said openings from said light source to produce a brake pulse;
   an amplifying transistor connected to said drive coil;
   a flipflop transistor arrangement being connected to said amplifying transistor to control the turning on and off of said amplifying transistor, said drive coil being energized when said amplifying transistor is on;
   means to apply said synchronizing pulses to one transistor of said flip-flop, blocking said one flipflop transistor and turning on said amplifying transistor, energizing said drive coil and causing said drive coupling arrangement to interconnect said drive means to said movable means to drive said movable means according to the predetermined synchronous pulses; and
   means to apply said brake pulses to the other transistor of said flipflop,, blocking said other flipflop transistor and turning off said amplifying transistor, de-energizing said drive coil and causing said drive coupling arrangement to disconnect said drive means from said movable means, whereby the speed of movement of said movable means is determined by the ratio of synchronizing to brake pulses.

References Cited by the Examiner

UNITED STATES PATENTS

| | | |
|---|---|---|
| 1,045,909 | 12/1912 | Thomas. |
| 2,411,122 | 11/1946 | Winther. |
| 2,449,779 | 9/1948 | Jaeschke. |
| 2,788,104 | 4/1957 | Mason. |
| 2,816,635 | 12/1957 | Danly et al. |
| 2,924,314 | 2/1960 | Shepard. |
| 2,946,418 | 7/1960 | Leeson. |

DAVID J. WILLIAMOWSKY, *Primary Examiner.*

DAVID G. REDINBAUGH, DON A. WAITE,
*Examiners.*

J. McHUGH, B. W. WYCHE, *Assistant Examiners.*